United States Patent [19]

Krylov et al.

[11] 3,982,456
[45] Sept. 28, 1976

[54] CIRCULAR SAW FOR CUTTING ROLLED PRODUCTS

[76] Inventors: Nikolai Ivanovich Krylov, 1 Novokuzminskaya 25, kv. 26; Boris Vasilievich Popov, Zelenodolskaya ulitsa 24, kv. 110, both of Moscow; Pavel Ivanovich Sidorov, Bykovskoe shosse, 26, kv. 124, Malakhovka 3, Moskovskoi oblasti; Jury Efimovich Kim, ulitsa Malomoskovskaya 3, kv. 43, Moscow, all of U.S.S.R.

[22] Filed: Sept. 29, 1975

[21] Appl. No.: 617,707

[52] U.S. Cl. ................................. 83/490; 83/481; 83/591
[51] Int. Cl.² ................. B23D 45/04; B23D 45/12; B23D 47/12
[58] Field of Search .............. 83/490, 481, 591, 594

[56] References Cited
UNITED STATES PATENTS

| | | |
|---|---|---|
| 3,353,430 | 11/1967 | Brackmann et al. ................... 83/490 |
| 3,738,215 | 6/1973 | Craig et al. ........................... 83/490 |
| 3,773,269 | 11/1973 | Brooks et al. ......................... 83/490 |

*Primary Examiner*—Donald R. Schran
*Attorney, Agent, or Firm*—Lackenbach, Lilling & Siegel

[57] ABSTRACT

A circular saw having a driven shaft carrying a saw disk, said saw disk being linked mechanically with the part of a driving shaft disposed together with the driven shaft in a common casing fixed rigidly and dismountably on a saw carrier. Said part of the driving shaft is coupled with the other part of the same shaft, and mounted in a hollow carrier shaft with a possibility of displacing axially when these parts are being detached. With the above embodiment of the circular saw, bearings of these shafts, exposed in operation to most severe wear, can be replaced relatively quickly.

5 Claims, 8 Drawing Figures

CIRCULAR SAW FOR CUTTING ROLLED PRODUCTS

The present invention relates to rolling-mill practice and more particularly to circular saws for cutting rolled products.

A circular saw for cutting rolled products, embodied according to the present invention, may prove to be most advantageous in cutting rolled products to lengths (cut lengths).

Known in the art are circular saws for cutting rolled products (mainly pipes), comprising a carrier mounted on a housing and a carrier hollow shaft being coupled through a reducer with a motor that is also set up on the housing. The reducer and the motor constitute an autonomous carrier drive. Mounted on the carrier parallel to its shaft is a driven shaft on which a saw disk is fixed.

To bring the saw disk into rotation the driven shaft is linked mechanically with a driving shaft aligned axially with the carrier shaft. The driving shaft is, in turn, linked mechanically with the shaft of the motor mounted on the housing.

Kinematic linkage between the driving, driven and motor shafts is effected by means of a belt drive. When the carrier is set in rotation, the constantly-rotating saw disk is brought to rolled products to cut them to specified lengths (see, e.g., GFR Patent No. 1164202).

Bearings of the driven and driving shafts rotating at a speed of up to 3000 rpm, as well as of the kinematic linkage (belts) interconnecting these shafts, fail in a family of saw units exposed in service to most severe wear.

The replacement of the wornout units involves the dismantling of both the driving and driven shafts. Upon replacing these wornout units both shafts — the driving and the driven one — are placed back in position and the belt drive is restored.

The dismantling and assembly of the driving and driven shafts, as well as the replacement of wornout units, are timeconsuming operations during which the circular saw is inoperative. And these replacements are to be carried out rather frequently, the saw output decreasing due to downtime caused by the replacement of the above units.

The main object of this invention is the provision of a circular saw for cutting rolled products with such a driving shaft whose design would allow speeding up considerably and facilitating the process of replacing wornout bearings and kinematic linking members of these shafts.

Another object of the invention is to decrease downtime of the circular saw and, hence, to enhance its output.

Still another object of the present invention is to enhance the reliability of operation of replaceable units by testing these unit assemblies on a special rig.

With these and other objects in view, there is proposed a circular saw for cutting rolled products, comprising a carrier with a hollow shaft furnished with an autonomous drive to bring it into rotation, a saw disk fixed on a driven shaft mounted on the carrier parallel to its shaft and linked mechanically with a driving shaft aligned axially with the carrier shaft and coupled with the shaft of a motor installed on a housing, wherein, according to the invention, the driving shaft is built up of two parts interconnected by means of a detachable joint, of which parts one is connected to the motor shaft so that it can be shifted axially when these parts of the driving shaft are being detached, the kinematic linkage between the driving and driven shafts being effected with the help of the other driving shaft part arranged together with the driven shaft in a common casing set up dismountably on the carrier.

It is expedient that the parts of the driving shaft be coupled through a permanent toothed clutch, one clutch member with an external toothing being rigidly fixed at the end of the driving shaft part linked mechanically with the driven shaft, whereas the clutch member with an internal toothing is to be connected by means of a splined joint to the end portion of the driving shaft part coupled with the motor shaft, said two clutch members being separated by a ball-and-socket bearing.

The above connection of the driving shaft parts is simple in terms of its design and makes it possible to offset shaft misalignment and to relieve from the toothed members of the clutch the weight of the driving shaft part coupled with the motor.

It is also no less expedient that the toothed clutch member mounted on the driving shaft part coupled with the motor shaft be chamfered, said chamfer being located on the side of the clutch from which the end of the driving shaft part is introduced and acting as a guide for the end portion of the driving shaft part, whereas the internal surface of the hollow carrier shaft should be provided with a collar so that the clearance between the collar and the driving shaft would be in essence equal to the height of the chamfer.

With the above design of the clutch member and of the hollow carrier shaft the end portion of the driving shaft part can be automatically introduced into a corresponding member of the toothed clutch when the parts of the driving shaft are being interconnected.

It is good practice that the part of the driving shaft coupled with the motor shaft be disposed in the hollow shaft of the carrier drive in a ball-and-socket bearing arranged in its housing whose external surface is provided with a thread to be brought in engagement with that on the internal surface of the carrier drive shaft.

The above embodiment of the driving shaft support is simple in design and features rather small overall dimensions, by which virtue it can be made integral with the carrier shaft.

It is also advisable that the opposite endfaces of the driving shaft part coupled with the drive shaft and of the drive shaft proper be spaced at a distance sufficient for axial displacement of this part of the driving shaft when it is being detached, the driving and motor shafts being interconnected through a clutch made up of three members, of which two members have an external toothing and are rigidly fixed at the ends of these shafts and the third one with an internal toothing encompasses the first two members and is slightly larger in length than the axial displacement of the driving shaft part.

With the driving and motor shafts coupled in the above manner the parts of the driving shaft can be detached most quickly without dismounting the clutch and the motor.

The circular saw for cutting rolled products embodied according to the present invention and installed in a rolling mill train (in a cutting section) ensures practically continuous operation of this section and enhances rolling-mill output by decreasing its downtime. Moreover, it alleviates substantially operating conditions, insofar as both the inspection and repairs of the most worn saw units can be effected on a rig, externally of the saw.

The nature of the invention will be clear from the following detailed description of its particular embodiment to be read in conjunction with the accompanying drawings, in which.

A circular saw for cutting rolled products comprises a housing 1 (FIGS. 1, 2) having mounted thereupon a carrier 2 which supports a saw disk 3.

Figure 3:
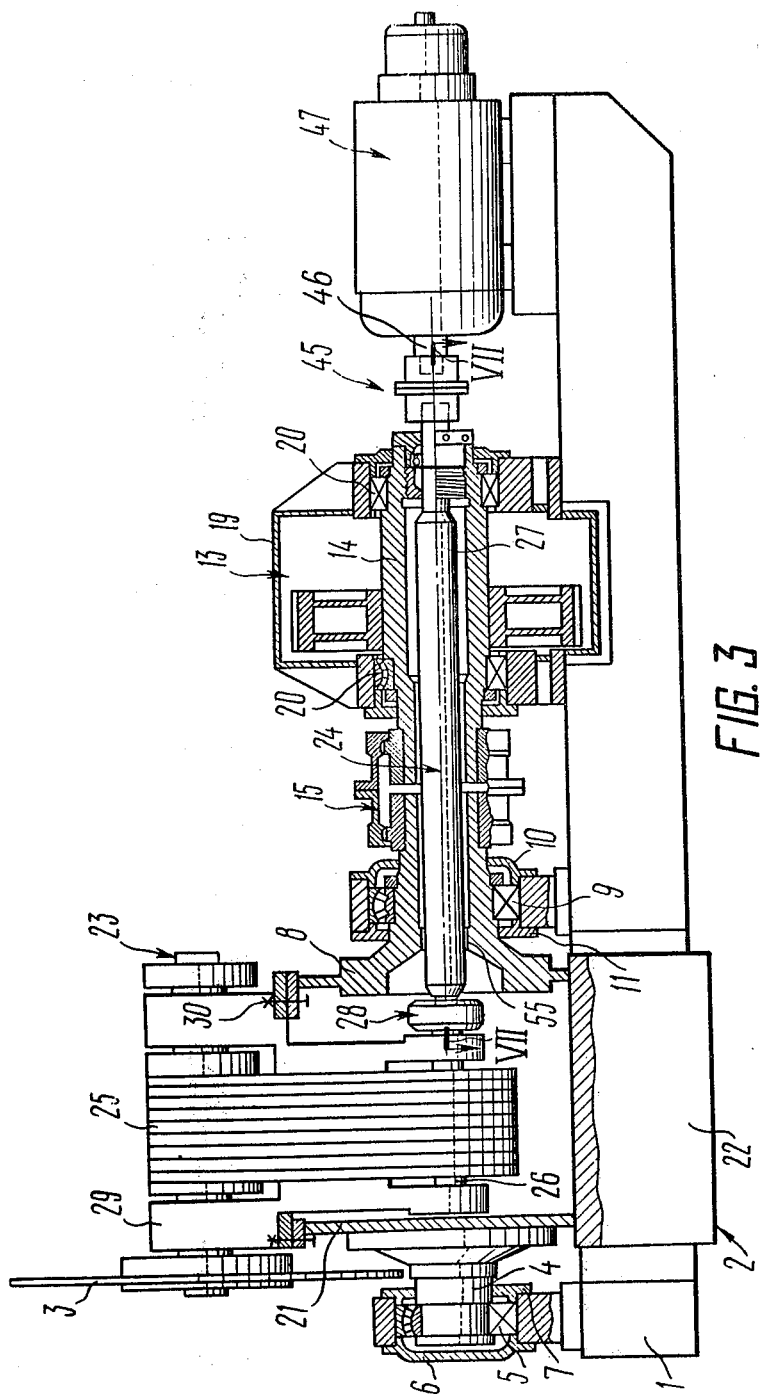
FIG. 3 is an elevated view of FIG. 2 partially in section taken in the direction of arrow B.

The carrier 2 rests with its journal 4 on a bearing 5 (FIG. 3) arranged on the housing 1. One endface of the bearing 5 is closed with a cover 6 and from the endface it is held in place against axial displacement by means of a ring 7.

A hollow shaft 8 of the carrier 2 rests on the housing 1 through a bearing 9 closed from one side with a cover 10 and held in place against axial displacement by means of a ring 11.

The shaft 8 of the carrier 2 is linked mechanically with a motor 12 (FIG. 1) set up on the housing 1. This kinematic linkage comprises a reducer 13, whose hollow output shaft 14 (FIG. 3) is coupled with the shaft 8 of the carrier 2 through a clutch 15, its input shaft 16 (FIG. 4) being coupled with a shaft 18 of the motor 12 through a clutch 17.

In the saw embodiment under consideration the hollow shaft 8 of the carrier 2 is aligned axially with the hollow shaft 14 of the reducer 13, the shaft 14 being an extension of the shaft 8 of the carrier 2.

Use may be made of some other known kinematic linkages between the carrier and motor shafts, suitable for this purpose.

The shaft 14 through its bearing 20 (FIG. 3) rests on a casing 19 of the reducer 13.

The carrier 2 is shaped as a box formed by parallel sidepieces 21 and a counterweight 22.

Mounted on the carrier 2 parallel to its hollow shaft 8 is a driven shaft 23 on which is cantilevered the saw disk 3. The driven shaft 23 is linked mechanically with a driving shaft 23 which passes through the hollow shaft 8 of the carrier 2 and hollow shaft 14 of the reducer 13. In the examplary embodiment being described this kinematic linkage is effected by means of a belt drive 25. However, the driven shaft 23 can be linked mechanically with the driving shaft 24 by means of some other kinematic linkage of the known design that is suitable for this purpose.

The driving shaft 24 is built-up of two parts 26 and 27 whose ends are interconnected by means of a toothed clutch 28.

The driven shaft 23, the part 26 of the driving shaft 24 and the belt drive 25 are arranged in a casing 29 fixed rigidly on the carrier 2 by bolts 30.

Figure 4:
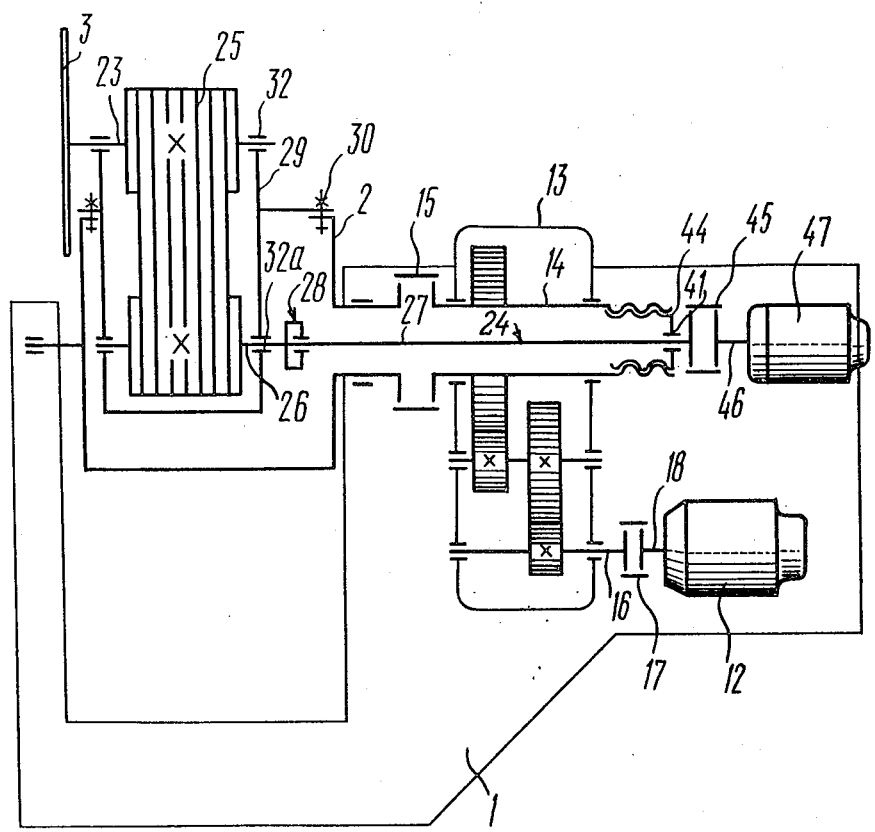
FIG. 4 is a schematic diagram of a gear train of a circular saw for cutting rolled products.
Figure 6:
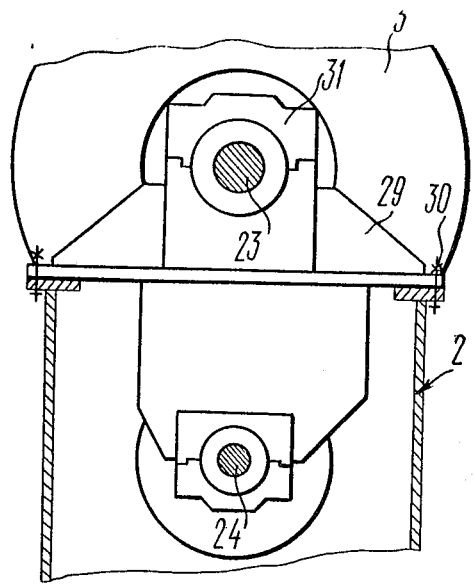
FIG. 6 is a cross-sectional view taken along the line VI—VI of FIG. 5.
Figure 5:
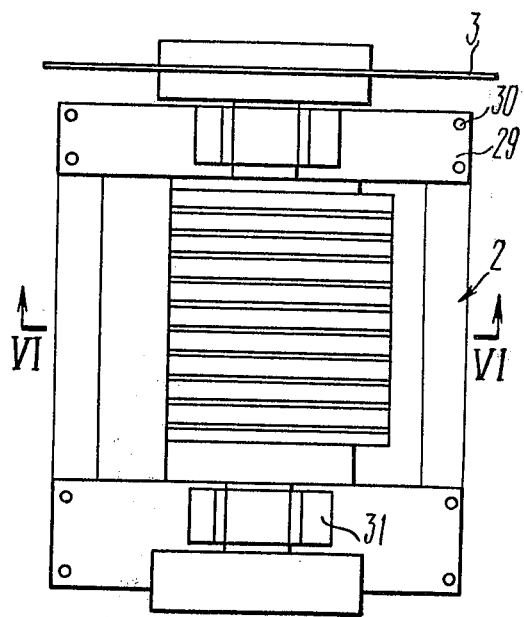
FIG. 5 shows a casing accommodating a driven shaft and a part of a driving shaft.

The casing 29 of welded construction is illustrated in FIGS. 5 and 6. The casing has seats 31 for bearings 32 (FIG.4) and 32a accordingly of the driven shaft 23 and of the part 26 of the driving shaft 24. The part 26 of the driving shaft 24 is slightly shorter tha the spacing between the sidepieces 21 of the carrier 2.

As the driven shaft 23, the part 26 of the driving shaft 24 and the belt drive 25 interconnecting these shafts are arranged in a common casing 29, the entire unit can be stripped quickly from the carrier 2 by turning out the bolts 30 and replaced by a new one or by the same unit subjected to repairs and preliminary prepared for operation, a feature which allows diminishing materially the saw downtime during routine repairs.

Figure 7:
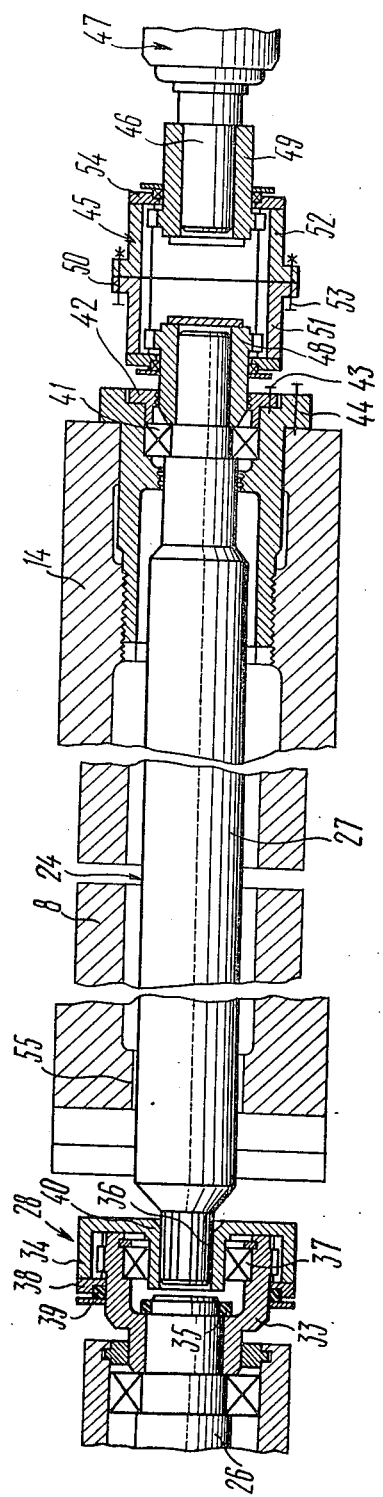
FIG. 7 is a greatly enlarged cross-sectional view taken along the line VII—VII of FIG. 3 and, FIG. 8 illustrates the motional path of a saw disk.

The toothed clutch 28 interconnecting the ends of the parts 26 and 27 of the driving shaft 24 is made up of two members 33 (FIG.7) and 34. The member 33 is rigidly fixed at the end of the part 26 of the driving shaft 24 and is held against axial displacement by means of a nut 35. The member 33 is fitted with an external toothing. The member 34 is connected to the end of the part 27 of the driving shaft 24 by means of a splined joint 36 and has an internal toothing.

The members 33 and 34 of the clutch 28 are permanently in mesh with their toothing. Mounted intermediate of the members 33 and 34 is a ball-and-socket bearing 37 acting as a ball bearing which takes up the weight of the part 27 of the driving shaft 24 mating with the clutch 28 and enabling the member 34 to turn with respect to the member 33 within the value of misalignment of the parts 26, 27 of the driving shaft 24. The member 34 is closed with a cover 38 having a rubber packing 39.

The part 27 of the driving shaft 24 is mounted in the hollow shafts 8 and 14 with a possibility of axial displacement to bring the parts 27 and 26 of the driving shaft 24 out of engagement when the casing 29 is removed from the carrier 2 together with the shaft 23 and part 26 accommodated therein.

To direct the part 27 when it is introduced into the member 34 of the clutch 28, the member 34 is provided with a coneshaped chamfer 40. The clutch 28 and a ball-and-socket bearing 41 serve as supports for the part 27 of the driving shaft 24. An outer cover 42 of this bearing is rigidly fixed with the aid of a bolt 43 to a housing 44 threaded from the exterior. Owing to this thread the housing 44 is permanently in mesh with a thread on the internal surface of the shaft 14.

With the above arrangement, providing free access to the support, the part 27 of the driving shaft 24 can be readily displaced.

The end portion of the part 27 of the driving shaft 24, opposed to its end coupled with the part 26, is connected to a shaft 46 of a motor 47 through a clutch 45.

The clutch 45 is made up of three members, of which two members 48 and 49 are provided with an external toothing and the third member 50, encompassing the first two members, has an internal toothing.

The member 48 is rigidly fixed at the end of the part 27 of the driving shaft 24, and the member 49 at the end of the shaft 46 of the motor 47. Adjacent endfaces of the shafts 24 and 46 are spaced at a distance sufficient for displacement of the part 27 of the driving shaft 24 when it is brought out of engagement with the clutch 28, i.e. for its axial displacement.

The member 50 is in turn built-up of two parts 51 and 52 interconnected by bolts 53 distributed uniformly along the circumference. The member 50 is bolted to the members 48 and 49 by means of covers 54.

The internal surface of the hollow shaft 14 has a collar 55 acting as a support for the part 27 of the driving shaft 24 when in its extreme right-hand (according to the drawing) position, i.e., when the parts 26 and 27 of the driving shaft 24 are detached. The collar 55 is shaped so that the clearance between this collar and the part 27 of the driving shaft 24 is equal to the height of the chamfer 40.

The herein-proposed circular saw for cutting rolled products operates in the following manner.

Prior to starting a cut the motor 27 is switched on and a torque is transmitted through the clutch 45, driving shaft 24 and belt drive 25 to the driven shaft 23 and, hence, to the saw disk 3 rotating at a constant speed. Then rolled products 56 (FIGS. 2, 8) which should be cut to specified lengths are fed to a cutting zone and stopped there. After that the motor 12 is switched on and a torque is transmitted through the reducer 13 to the shaft 8 of the carrier 2 to accelerate it to a prescribed feeding speed.

On being accelerated the carrier 2 continues to move and a cut is performed. Next the carrier 2 is braked with the aid of the motor 12 and after making a full turn it is stopped in its initial position.

Figure 8:
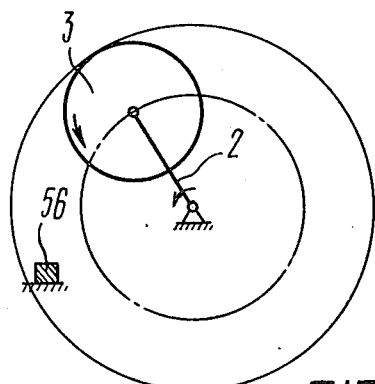

Both the acceleration and braking of the carrier 2 are effected with the saw disk 2 moving along a circular path, as shown in FIG. 8, and the carrier 2 rotating in one and the same direction. This allows attaining relatively high speeds (1.0 m/s and over) of feeding the saw disk 3 when cutting the rolled products 56 without high dynamic loads. It also affords the possibility of carrying out two operations simultaneously: the return of the saw disk 3 into its initial position and the conveying of the rolled products 56 being cut on a roll table (not shown in the drawing).

Figure 1:
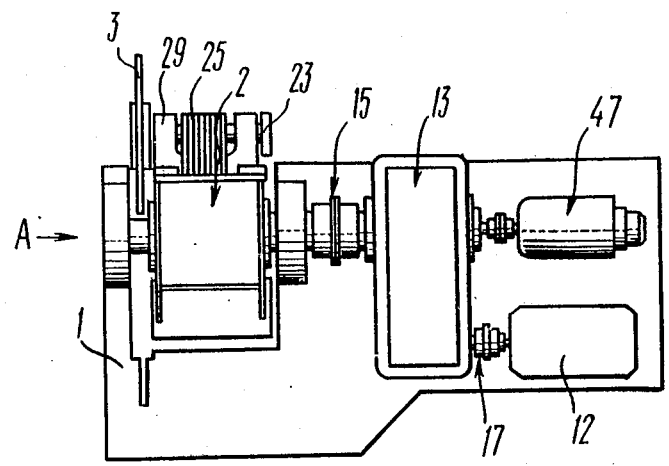
FIG. 1 is a top view of a circular saw for cutting rolled products, according to the invention.
Figure 2:
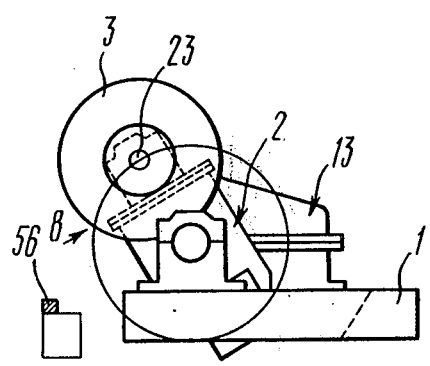
FIG. 2 is a side view of FIG. 1 taken in the direction of arrow A.

With the circular saw in operation the bearings of the driven shaft 23 and of the part 26 of the driving shaft 24, as well as the drive interconnecting these shafts, are exposed to intense wear. To replace these units and to enable their repairs the casing 29, together with the driven shaft 23 with the disk 3, the part 26 of the driving shaft 24 and the belt drive 25 contained therein is stripped off from the carrier 2. To remove the casing 29 the part 27 of the driving shaft 24 is shifted axially clockwise according to the drawing (FIGS. 1, 4). To this end the housing 44 is rotated with respect to the shaft 14 and the part 27 is therefore displaced until it is brought out of engagement with the splits of the member 34. As soon as the end of the part 27 of the driving shaft 24 is released from the member 34, it will rest on the collar 55 provided on the internal surface of the hollow shaft 14. At this time the other end of the part 27 of the driving shaft 24 moves together with the member 48 of the clutch 45 along the member 50, passing the distance between the opposite endfaces of the shafts 24 and 46 until the part 27 emerges completely from the member 34 of the clutch 28. After the parts 26 and 27 of the driving shaft 24 have been disengaged, the bolts 30 are turned out releasing the casing 29 from the carrier 2. Next the casing 29, together with the driven shaft 23 with the saw disk 3 and the part 26 of the driving shaft 24 accommodated therein, is taken out of the carrier 2 without stripping other units of the saw.

Erection of the removable casing 29 with repaired or renewed units is effected by using reverse sequence of operations, i.e. the casing 29, on being introduced together with the units contained therein into the space between the sidepieces 21 of the carrier 2, is fastened thereto by the bolts 30. Then by rotating the housing 44 the part 27 of the driving shaft 24 is shifted counterclockwise until it is brought in engagement with the member 34 of the clutch 28. During this operation the member 48 of the clutch 45 moves along the internal toothing of the member 50.

In this way wornout units and parts of the circular saw can be replaced in a relatively short time period without stripping the unit proper of the saw mounted in a rolling-mill train. It allows diminising materially mill downtime for replacing worn units of the circular saw, facilitating considerably both the operation and maintenance of such saws and enhancing its output and, consequently, the capacity of the entire cutting line.

What we claim is:

1. A circular saw for cutting rolled products, comprising: a housing; a carrier mounted on said housing; a hollow shaft of said carrier; an autonomous drive connected to said hollow shaft to bring said carrier into rotation; a casing secured dismountably on said carrier; a driven shaft arranged in said casing parallel to said hollow shaft of said carrier; a saw disk fixed on said driven shaft; a driving shaft built up of two parts interconnected by means of a detachable joint and mounted in said hollow shaft coaxially therewith; a means for connecting the parts of said driving shaft; one part of said driving shaft set up in said casing and linked mechanically with said driven shaft; a motor located on the housing; a shaft of said motor coupled with the other part of said driving shaft, said part of said driving shaft coupled with said shaft of said motor so that it has a possibility of displacing axially when these parts of said driving shaft are being detached.

2. A circular saw of claim 1, wherein the driving shaft parts are interconnected by means of a permanent toothed clutch, one clutch member with an external toothing being rigidly fixed at the end of the driving shaft part that is linked mechanically with the driven shaft, whereas the other member of said clutch with an internal toothing is coupled by means of a splined joint to the end of the driving shaft part that is linked mechanically with the motor shaft, said clutch members being separated by a ball-and-socket bearing placed therebetween.

3. A circular saw of claim 2, wherein the member of the toothed clutch mounted on the driving shaft part coupled with the motor shaft is chamfered from the side wherefrom the driving shaft part is introduced, said chamfer acting as a guide for the end of this driving shaft part, and the internal surface of the hollow carrier shaft is provided with a collar so that the clearance between this collar and the driving shaft is essentially equal to the height of said chamfer.

4. A circular saw of claim 1, wherein the driving shaft part coupled with the motor shaft is set up in the hollow shaft of the carrier drive in a ball-and-socket bearing arranged in its housing whose external surface is threaded, the thread being brought in engagement with that on the internal surface of the carrier drive shaft.

5. A circular saw of claim 1, wherein the opposed endfaces of the driving shaft part coupled with the motor shaft, and of the motor shaft are spaced at a distance sufficient for axial displacement of this driving shaft part when said shaft is being detached, and the ends of these shafts are interconnected by a clutch up of three members, of which two members with an external toothing are rigidly fixed at the ends of these shafts and the third member encompassing the first two members and having an internal toothing is slightly longer than the axial displacement of the driving shaft part.

* * * * *